United States Patent [19]

Frano

[11] Patent Number: 4,893,978
[45] Date of Patent: Jan. 16, 1990

[54] QUARTER-TURN DETENT TWISTLOCK

[75] Inventor: Francis G. Frano, Hoffman Estates, Ill.

[73] Assignee: Illinois Tool Works Inc., Chicago, Ill.

[21] Appl. No.: 307,918

[22] Filed: Feb. 9, 1989

[51] Int. Cl.[4] .............................................. F16B 21/00
[52] U.S. Cl. ..................................... 411/553; 24/297; 24/590; 403/348; 411/508
[58] Field of Search .................. 411/553, 508–510, 411/500, 502, 549, 349, 550, 908, 913; 403/348, 405.1; 24/297, 590, 591

[56] References Cited

U.S. PATENT DOCUMENTS

| | | | |
|---|---|---|---|
| 3,186,049 | 6/1965 | Fiddler | 411/913 X |
| 3,220,078 | 11/1965 | Preziosi | 411/508 X |
| 4,262,394 | 4/1981 | Wright | 411/508 X |
| 4,652,192 | 3/1987 | Schaller | 411/549 X |
| 4,740,026 | 4/1988 | Wagner | 403/348 X |

FOREIGN PATENT DOCUMENTS

| | | | |
|---|---|---|---|
| 2161626 | 6/1973 | Fed. Rep. of Germany | 24/591 |
| 1380227 | 10/1964 | France | 24/297 |
| 1136662 | 12/1968 | United Kingdom | 411/553 |

Primary Examiner—Lloyd A. Gall
Attorney, Agent, or Firm—John P. O'Brien; Thomas W. Buckman

[57] ABSTRACT

A twistlock fastener is constructed of a latching member and a base member. The base member has a socket portion with a square-shaped internal bore. The latching member is formed with head portion and a shank portion. The shank portion has a cylindrical section adjacent to the head portion and has a pair of resilient bifurcated leg elements integrally formed with the cylindrical section. Each of the leg elements have a radial surface to provide a latching shoulder. Each latching lateral shoulder is formed with a width sufficient to retain the shank portion in the square-shaped internal bore. Each of the opposite side surfaces at the opposite ends of the latching shoulder for both leg elements lie in a common flat plane which is perpendicular to the latching shoulders. The surface on each of the leg elements that extends axially from and adjacent to each latching shoulder is flat, and the corner surfaces along each of the leg elements adjacent to each of the opposite side surfaces are rounded along the length of the leg elements.

6 Claims, 1 Drawing Sheet

QUARTER-TURN DETENT TWISTLOCK

BACKGROUND OF THE INVENTION

In the design of a twistlock fastener, one of the most important features is to have a very positive set of latching positions so that the user will know exactly at which of the positions the latching head is located.

Many of the prior art twistlock fasteners operate on the principle of its latching head acting against a resilient spring member, such as disclosed in U.S. Pat. Nos. 3,344,488; 2,382,943 and 1,190,582; British Patent No. 10,660; Swedish Pat. No. 176,401 and West German Patent No. 2,161,626. The difficulty with each of these prior art devices is that they do not provide a very positive latching arrangement.

One twistlock fastener that has been found to give a positive set of latching positions is disclosed in U.S. Pat. No. 4,498,827. Unfortunately, this fastening device has a very complex design requiring exact dimensional compliance between the latching member and the base member which is difficult to manufacture and assemble. Also, this patented structure does not perform as a one-quarter turn twistlock since it has three distinct settings for every one-quarter turn.

This invention is directed to a novel latch member that cooperates in a square-shaped aperture of the base member to provide a one-quarter turn twistlock fastener with very positive quarter turn latching positions. The simplicity of the design of this novel twistlock fastener makes it easy to manufacture and to assemble.

SUMMARY OF THE INVENTION

A quarter-turn twistlock fastener is constructed of a latching member and a base member. The base member is formed with a socket portion having a square-shaped internal bore. The latching member has a head portion and a shank portion, where the shank portion is formed with a cylindrical section and a pair of resilient leg elements integrally formed with the cylindrical section. Each of the leg elements have a radial surface to provide a latching shoulder, and the lateral shoulders are of a width sufficient to retain the shank portion in the square-shaped bore. Each of the opposite side surfaces of the leg elements lie in a common flat plane perpendicular to and at opposite ends of latching shoulders. The surface on each of the leg elements that extends axially from and adjacent to each latching shoulder is substantially flat across its length and is perpendicular to the common flat planes. The generally square shaped shank portion is rotatable by virtue of rounded corner surfaces being formed along the length of the leg elements adjacent to the opposite side surfaces.

DESCRIPTION OF DRAWING

For a better understanding of this invention, reference may be made to the accompanying drawing, in which.

DESCRIPTION OF PREFERRED EMBODIMENT

Figure 1:
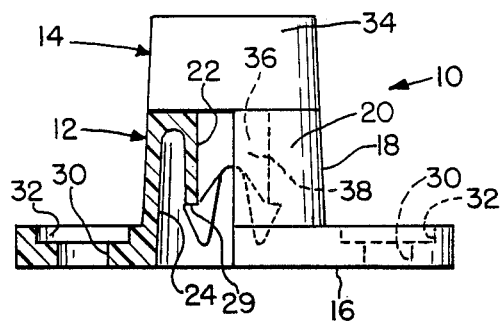
FIG. 1 is a front elevational view of the preferred embodiment of this invention with the left half of the base member shown in cross section.
Figure 2:
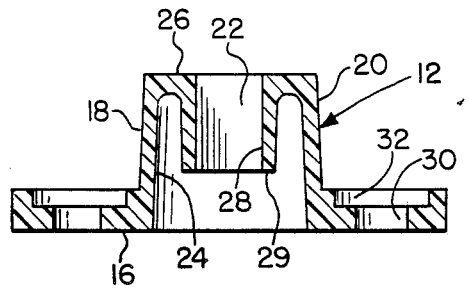
FIG. 2 is a cross sectional view of the base member which is depicted in FIG. 1.
Figure 3:
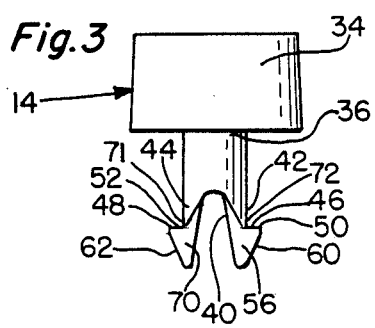
FIG. 3 is a front elevational view of the latching member for the preferred embodiment of this invention.
Figure 4:
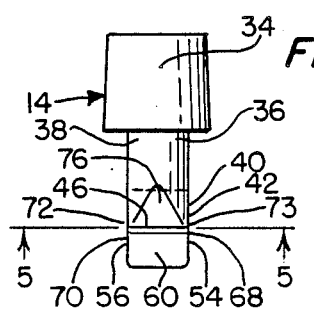
FIG. 4 is a side elevational view of the latching member taken from the right side of FIG. 3.
Figure 5:
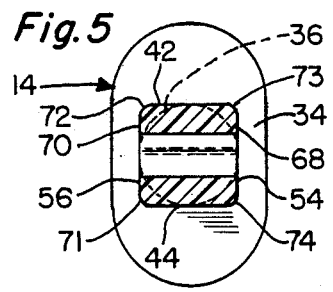
FIG. 5 is a cross sectional view of the latching member taken along the line 5–5 of FIG. 4 and looking in the direction of the arrows.
Figure 6:
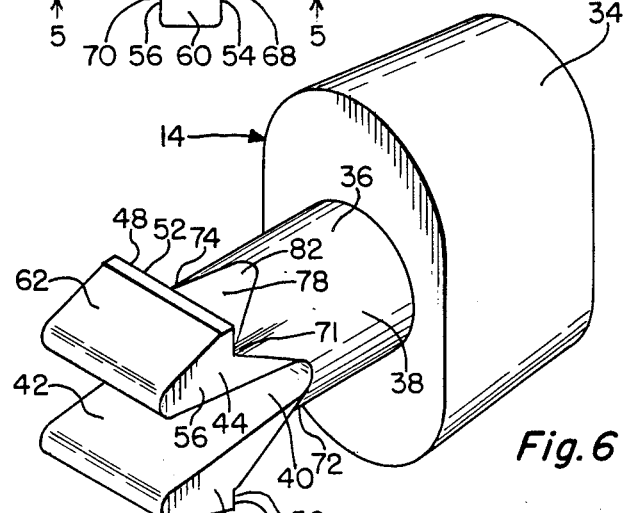
FIG. 6 is perspective view of the latching member.

There is shown in FIG. 1, a twistlock fastener generally designated by the reference 10 and incorporating the principles of this invention. Twistlock fastener 10 is constructed of a base member 12 and latching member 14.

Base member 12 has a mounting portion 16 and socket portion 18. The socket portion 18 is integrally formed at the center of the oblong-shaped mounting portion 16 and is constructed as an upstanding oval neck section 20 having a square-shaped bore 22 extending through its center area. The continuous oval-shaped outer wall 24 of neck section 20 extends upwardly from mounting portion 16 and is integrally connected to an oval-shaped top wall 26. A continuous internal square-shaped wall 28 is formed integrally with the inside marginal edges of top wall 26 to define square-shaped bore 22.

The length of the square-shaped wall 28 is substantially less than the length of outer wall 24 to provide a latching surface 29 at its inner end for retaining the latching member 14 in a fixed rotatable position with respect to base member 12, as will be explained in detail hereinafter.

On both ends of socket portion 18 there is provided a mounting aperture 30. Each mounting aperture 30 is formed with an enlarged upper diameter portion 32 for receiving the head of a screw fastener in a flush-mounted relation.

The latching member 14 has head portion 34 and shank portion 36. The head portion 34 can be of any cross sectional shape, but is shown for illustration purposes as oval. While the shape is not significant, it is important that its cross sectional dimensions be greater than that of shank portion 36.

The shank portion 36 has a cylindrical section 38 formed adjacent head portion 34 and a leg section 40 extending axially from the outer end of cylindrical section 38. The leg section 40 comprises bifurcated leg elements 42 and 44. The leg elements 42 and 44 are formed with lateral radial surfaces 46 and 48, respectively, to provide latching shoulders 50 and 52, respectively.

Latching shoulders 50 and 52 extend in radially opposite directions from the central axis of the shank portion 36. The sidewall surfaces 54 and 56 formed at the opposite ends of latching shoulders 50 and 52 are generally flat for the length of shank portion 36, and extend generally perpendicular to latching shoulders 50 and 52.

Referring now to FIG. 1, there is shown the assembly of the latching member 14 into the socket portion 18 of base member 12. This assembly is readily accomplished by inserting the shank portion 36 through the square-shaped opening formed in the center of top wall 26 into square-shaped bore 22.

Ramp surfaces 60 and 62 are formed on the outer ends of resilient leg elements 42 and 44, respectively, to cause the resilient leg elements to squeeze together as the leg elements 42, 44 are inserted inwardly into square-shaped bore 22. With the leg elements squeezed together by ramp surfaces 60 and 62, shank portion 36 is pushed through bore 22 until head portion 34 is contiguous to top wall 26.

Because the distance from the latching shoulders 50, 52 to head portion 34 is slightly greater than the length of bore 22, the latching shoulders 50, 52 will then extend beyond square-shaped latching surface 29 to free the resilient leg elements 42, 44 to spring into a radial outward position, as shown in FIG. 1. In this position, latching member 14 is rotatably held within base member 12.

The side surfaces 54 and 56 of leg elements 42 and 44 are formed with common flat parallel surfaces 68 and 70, respectively, that extend generally perpendicular to latching shoulders 50, 52. The distance between the common flat parallel surfaces 68 and 70 is slightly less than the length of side walls 28 of square-shaped bore 22 which length of the side walls defines the length of latching surface 29.

To permit the latching member 14 to be rotatable relative to the square-shaped bore 22 in base member 12, it is necessary to have four rounded corner edges 71, 72, 73 and 74 extending lengthwise of the bifurcated leg section 40 between the cylindrical section 38 and the latching shoulders 50 and 52.

In order to provide positive quarter-turn latching positions, a flat surface 76 and 78 is formed on leg elements 42 and 44, respectively, intermediate the rounded corner edges 71-74. The flat surfaces 76 and 78 extend from latching shoulders 50 and 52, respectively, and tapers inwardly in an axial direction to an apex at its juncture with the cylindrical section to form triangular sections 80 and 82. The size of triangular sections 80 and 82 determines of the amount of resistance to the latching member being rotated to the next position. A larger size triangular section will provide greater resistance to rotation.

Figure 7:
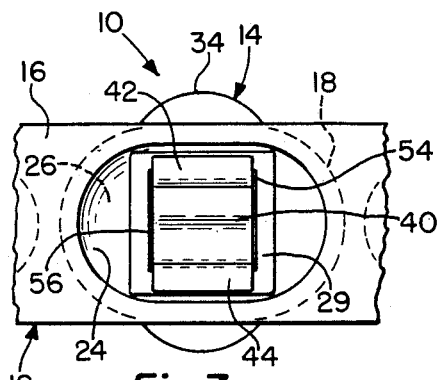
FIG. 7 is a partial bottom plan view of the preferred embodiment with the latching member shown in one of its two quarter-turn positions.
Figure 8:
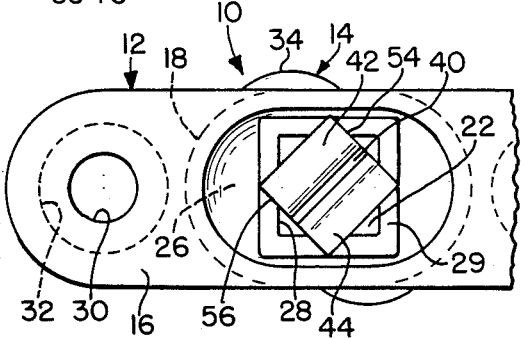
FIG. 8 is a partial bottom plan view of the preferred embodiment with the latching member shown one-half way between its quarter-turn positions.

As depicted in FIG. 8, a rotational force on head portion 34 in either direction causes the resilient leg elements 42 and 44 to be squeezed towards each other as the four rounded corners 71-74 engage the side walls 28 of square-shaped bore 22. After the latching member 14 is rotated ninety degrees, the flat triangular sections 80 and 82 and the common flat surfaces 68 and 70 are brought into engagement with the four side walls 28 of bore 22 to provide a very positive quarter-turn position as shown in FIG. 7.

From the foregoing description, it will be appreciated that the rounded corners 71-74 on resilient leg elements 42 and 44 permit the latching member 14 to be rotated in the square-shaped bore 22 and that flat parallel surfaces 68 and 70 cooperate with flat parallel surfaces 76 and 78 (adjacent latching shoulders 50 and 52) to provide very positive quarter-turn positions.

I claim:

1. A twistlock fastener comprising a latching member and a base member, said base member having a socket portion with a square-shaped internal bore, said latching member comprising a head portion and a shank portion, said shank portion having a cylindrical section with one end adjacent to said head portion and a pair of resilient leg elements connected to the other end of said cylindrical section, each of said leg elements including a latching shoulder, said shoulders extending in opposite radial directions from an axis of said shank portion, the length of said shoulder across each leg element being slightly less than the length of a side wall of said square-shaped bore, each of said shoulders being of a width in said radial directions sufficient to retain said shank portion in said square-shaped bore, opposite side surfaces of said leg elements each lying in a common flat plane perpendicular to and at opposite ends of said shoulders, the surface on each of said leg elements which extends axially from said shoulder at an intermediate location being flat and being perpendicular to said common flat planes, and corner surfaces formed along and adjacent to each of said opposite side surfaces being rounded to permit the rotation of said latching member relative to said base member.

2. A twistlock fastener as defined in claim 1, wherein said flat surface on each of said leg elements extends axially to the juncture with said cylindrical section.

3. A twistlock fastener as defined in claim 2, wherein said flat surface on each of said leg elements tapers inwardly from said shoulder to the juncture with said cylindrical section to define a triangular-shaped flat surface on each leg element.

4. A twistlock fastener comprising a latching member and a base member, said base member having a socket portion with a square-shaped internal bore, said latching member comprising a head portion and a shank portion, said shank portion having a cylindrical section with one end adjacent to said head portion and resilient bifurcated leg elements integrally formed with the other end of said cylindrical section each of said leg elements including a right-angled latching shoulder extending in an outward radial direction from an axis of said shank portion, the length of said shoulders across each of said leg elements being slightly less than the length of a side wall of said square-shaped bore, each of said shoulders being of a width in said radial direction sufficient to retain said shank portion in said square-shaped bore, said length of said shoulders being equal to approximately the diameter of said cylindrical section, opposite side surfaces of said leg elements each lying in a common flat plane perpendicular to and at opposite ends of said shoulders, the surface on each of said leg elements which extends axially from said shoulder and intermediate its length being flat and being perpendicular to said common flat planes, and corner surfaces formed along each of said leg elements and adjacent to each of said opposite side surfaces being rounded along the length of said leg elements to permit the rotation of said latching member relative to said base member .

5. A twistlock fastener as defined in claim 4, wherein said flat surface on each of said leg elements extends axially to the juncture with said cylindrical section.

6. A twistlock fastener as defined in claim 5, wherein said flat surface on each of said leg elements tapers inwardly from said shoulder to the juncture with said cylindrical section to define a triangular shaped flat surface on each leg element.

* * * * *